(12) United States Patent
Kato et al.

(10) Patent No.: US 12,447,643 B2
(45) Date of Patent: Oct. 21, 2025

(54) CUTTING DEVICE INCLUDING FIRST BLADE EDGE PORTION, AND SECOND BLADE EDGE PORTION IN WHICH SHEARING ANGLE AT CENTER PORTION IS LARGER THAN SHEARING ANGLE AT END PORTIONS

(71) Applicant: BROTHER KOGYO KABUSHIKI KAISHA, Nagoya (JP)

(72) Inventors: Yushi Kato, Nagoya (JP); Shinji Kobayashi, Tokoname (JP); Sho Asai, Nisshin (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 336 days.

(21) Appl. No.: 18/325,414

(22) Filed: May 30, 2023

(65) Prior Publication Data

US 2023/0381991 A1 Nov. 30, 2023

(30) Foreign Application Priority Data

May 31, 2022 (JP) .................................. 2022-088220

(51) Int. Cl.
*B26D 1/00* (2006.01)
*B26D 1/02* (2006.01)
(Continued)

(52) U.S. Cl.
CPC ........... *B26D 1/0006* (2013.01); *B26D 1/025* (2013.01); *B26D 1/065* (2013.01); *B26D 2001/0066* (2013.01); *B26D 2007/005* (2013.01)

(58) Field of Classification Search
CPC ............................. B26D 1/025; B26D 1/065; B26D 2001/0066; B26D 1/0006
See application file for complete search history.

(56) References Cited

U.S. PATENT DOCUMENTS 8,562,229 B2 * 10/2013 Inaba .................... B26D 1/085
400/621
8,887,605 B2 * 11/2014 van Gemert ........ B02C 18/2233
83/385

(Continued)

FOREIGN PATENT DOCUMENTS

JP 2007-196348 A 8/2007
JP 2021-20310 A 2/2021

*Primary Examiner* — Sean M Michalski
(74) *Attorney, Agent, or Firm* — KENEALY VAIDYA LLP

(57) ABSTRACT

A cutting device includes: a frame; a fixed blade including a first blade edge portion extending in an extending direction; a movable blade movable in a moving direction; a driving mechanism; and a pressing member. The movable blade includes: a second blade edge portion; and a contacting portion. The second blade edge portion has a valley-like shape such that a center portion in the extending direction thereof is closer to the contacting portion than end portions in the extending direction thereof are to the contacting portion. The second blade edge portion has shearing angles that are inclination angles relative to the extending direction. The shearing angles includes a first shearing angle that is the shearing angle at each end portion and a second shearing angle that is the shearing angle at the center portion. The second shearing angle is larger than the first shearing angle.

9 Claims, 10 Drawing Sheets

(51) Int. Cl.
  *B26D 1/06*   (2006.01)
  *B26D 7/00*   (2006.01)

(56) References Cited

U.S. PATENT DOCUMENTS

| | | | |
|---|---|---|---|
| 8,997,613 B2* | 4/2015 | Bohn | B23D 31/008 |
| | | | 83/23 |
| 11,731,300 B2* | 8/2023 | Lülfing | B26D 5/02 |
| | | | 83/564 |
| 2007/0175307 A1 | 8/2007 | Ito | |
| 2013/0039686 A1* | 2/2013 | Yazawa | B23P 15/40 |
| | | | 400/621 |
| 2013/0305896 A1* | 11/2013 | Pisczak | B23D 35/001 |
| | | | 83/694 |
| 2021/0031543 A1 | 2/2021 | Shinoda | |

\* cited by examiner

CUTTING DEVICE INCLUDING FIRST BLADE EDGE PORTION, AND SECOND BLADE EDGE PORTION IN WHICH SHEARING ANGLE AT CENTER PORTION IS LARGER THAN SHEARING ANGLE AT END PORTIONS

REFERENCE TO RELATED APPLICATIONS

This application claims priority from Japanese Patent Application No. 2022-088220 filed on May 31, 2022. The entire content of the priority application is incorporated herein by reference.

BACKGROUND ART

A prior art describes a printing device including a cutting device configured to cut a printing medium paid out of a roll of the printing medium. The cutting device includes a frame, a fixed blade, a movable blade, and a pressing member. The fixed blade is fixed to the frame such that a linear cutting edge faces downward. The movable blade is supported by the frame so as to be movable in an up-down direction while a V-shaped cutting edge faces upward. The movable blade includes a lower portion extending downward.

The cutting edge of the movable blade contacts the cutting blade of the fixed blade at two points of contact. The lower portion of the movable blade contacts the frame at one point of contact. The pressing member is fixed to the frame to urge the movable blade toward the fixed blade such that the cutting edge of the movable blade and the cutting edge of the fixed blade rub against each other at two points of contact to thereby generate rubbing load. In accordance with upward movement of the movable blade, the cutting edge of the movable blade and the cutting edge of the fixed blade nip the printing medium therebetween and cut the printing medium from widthwise ends thereof toward the widthwise center thereof.

DESCRIPTION

In the conventional cutting device, since the pressing member is fixed to the frame, a pressing force from the pressing member applied to the lower portion of the movable blade becomes greater than that applied to the cutting edge of the movable blade as the movable blade is moved upward. Further, in accordance with the upward movement of the movable blade, the two points of contact at which the cutting edge of the movable blade contacts the cutting edge of the fixed blade approach each other so that an imaginary triangle defined by the two points of contact and the one point of contact at which the lower portion of the movable blade contacts the frame becomes smaller, thereby causing a difference in rubbing loads generated at the two points of contact to become greater. Hence, in a case where a printing medium softer than before is used in the printing device, rubbing load at a center portion of the V-shape of the cutting edge becomes insufficient, and thus, cutting malfunction is likely to occur.

In view of the foregoing, it is an object of the present disclosure to provide a cutting device capable of cutting a target to be cut well.

In order to attain the above and other object, the present disclosure provides a cutting device including: a frame; a fixed blade; a movable blade; a driving mechanism; and a pressing member. The fixed blade has a substantially flat plate-like shape and is fixed to the frame. The fixed blade includes a first blade edge portion extending linearly in an extending direction. The movable blade has a substantially flat plate-like shape. The movable blade is configured to be guided by the frame so as to be movable in a moving direction crossing the extending direction. The movable blade has one side portion and another side portion in the moving direction. The movable blade includes: a contacting portion; and a second blade edge portion. The contacting portion is provided at the another side portion of the movable blade and contacts the frame. The second blade edge portion is provided at the one side portion of the movable blade. The second blade edge portion has a substantially valley-like shape such that a center portion in the extending direction of the second blade edge portion is positioned closer to the contacting portion than both end portions in the extending direction of the second blade edge portion are to the contacting portion. The second blade edge portion is configured to rub against the first blade edge portion to cut a cut target. The driving mechanism is configured to move the movable blade. The pressing member is configured to urge the movable blade in a first direction from the movable blade toward the fixed blade and the frame. The second blade edge portion has a plurality of shearing angles that are inclination angles relative to the extending direction. The shearing angles includes a first shearing angle that is the shearing angle at each end portion and a second shearing angle that is the shearing angle at the center portion. The second shearing angle is larger than the first shearing angle.

In the above structure, the first shearing angle at the each end portion in the extending direction of the movable blade is smaller than the second shearing angle at the center portion in the extending direction of the movable blade. At a timing when the movable blade starts to be moved in the moving direction during a cutting operation, two points of contact at which the second blade edge portion contacts the first blade edge portion are distant from each other. Therefore, a variance in rubbing load on the second blade edge portion at the two points of contact is hardly to occur, thereby stabilizing rubbing load on the second blade edge portion at the two points of contact.

Further, at a timing when the movable blade starts to be moved, a pressing force imparted on the movable blade by the pressing member is sufficiently large at the second blade edge portion. In this structure, since the first shearing angle at the end portions is smaller than the second shearing angle at the center portion, the cutting device does not apply excessively large cutting load on the target to be cut. Hence, the cut target can be cut properly.

Still further, in accordance with further movement in the moving direction of the movable blade, the two points of contact between the first blade edge portion and the second blade edge portion approach each other to cause the stability of the rubbing load on the second blade edge portion to be lowered. In accordance with the movement in the moving direction of the movable blade, a pressing force imparted on the movable blade by the pressing member becomes greater at the contacting portion than at the second blade edge portion. Even in this configuration, since the second shearing angle at the center portion is greater than the first shearing angle at the end portions, sufficient rubbing load on the second blade edge portion can be still ensured in spite of the fact that the pressing force applied to the second blade edge portion is reduced, whereby the cut target can be cut well.

Hereinafter, a cutting device 100 according to one embodiment of the present disclosure will be described while referring to the accompanying drawings. The cutting device 100 is mounted in a printing device 1, for example, and is configured to cut a printing medium 7 on which an image has been printed by the printing device 1 as a cut target. The printing medium 7 is a flexible sheet and, for example, a tape having a thickness of smaller than or equal to 0.1 mm. A roll 8 formed by winding the printing medium 7 is attachable to the printing device 1.

Figure 1:
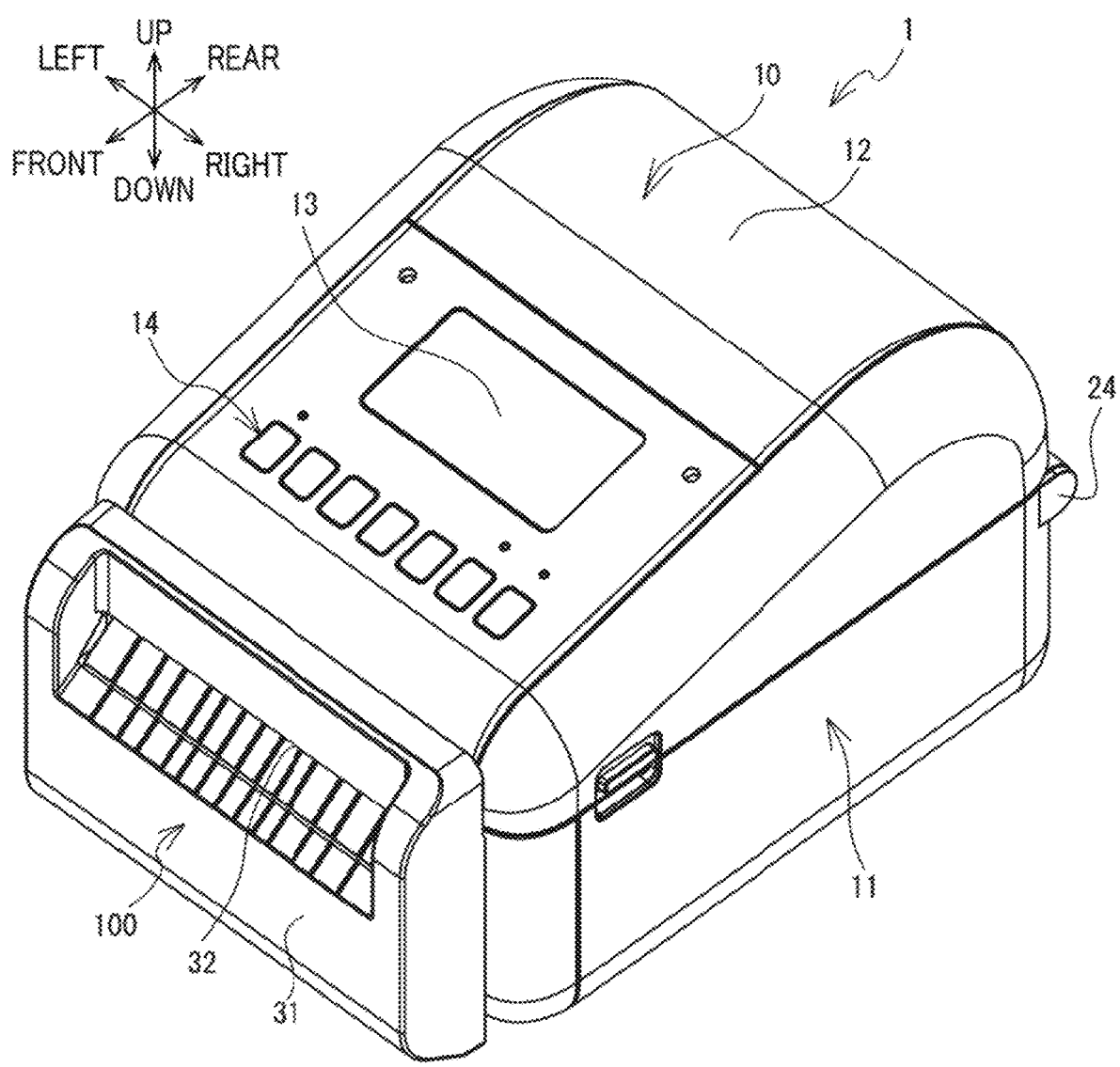
FIG. 1 is a perspective view of a printing device.

The printing device 1 will be described with reference to FIGS. 1 and 2. In the following description, "left", "right", "front", "rear", "up", and "down" indicated by arrows in the drawings correspond to the left side, the right side, the front side, the rear side, the upper side, and the lower side of the printing device 1, respectively. The printing device 1 includes a main casing 10 having a box-like shape elongated in a front-rear direction. The main casing 10 is made of resin, for example. The main casing 10 has a front end portion in which the cutting device 100 is mountable.

The cutting device 100 has a front-upper portion formed with a unit discharge opening 32. The unit discharge opening 32 is a slit elongated in a left-right direction and allows the printing medium 7 on which an image has been printed inside the printing device 1 to be discharged out of the printing device 1 therethrough.

The main casing 10 includes a lower casing 11, and an upper casing 12. The lower casing 11 has a generally rectangular parallelepiped (box-like) shape and formed with an upper open end. The lower casing 11 constitutes a lower portion of the main casing 10. The lower casing 11 includes a shaft portion 24. The shaft portion 24 is positioned at a rear portion of the lower casing 11, and extends in the left-right direction.

The upper casing 12 has a substantially box-like shape and formed with a lower open end. The upper casing 12 constitutes an upper portion of the main casing 10. The upper casing 12 is supported by the lower casing 11 so as to be pivotally movable about the shaft portion 24. The upper casing 12 is configured to open and close the upper open end of the lower casing 11. In a state where the upper casing 12 closes the upper open end of the lower casing 11, an upper surface of the upper casing 12 is inclined diagonally downward toward a front end of the upper casing 12. A display portion 13 and an operating portion 14 are provided on the upper surface of the upper casing 12. The operating portion 14 is configured to receive various instructions to the printing device 1 inputted by a user.

Figure 2:
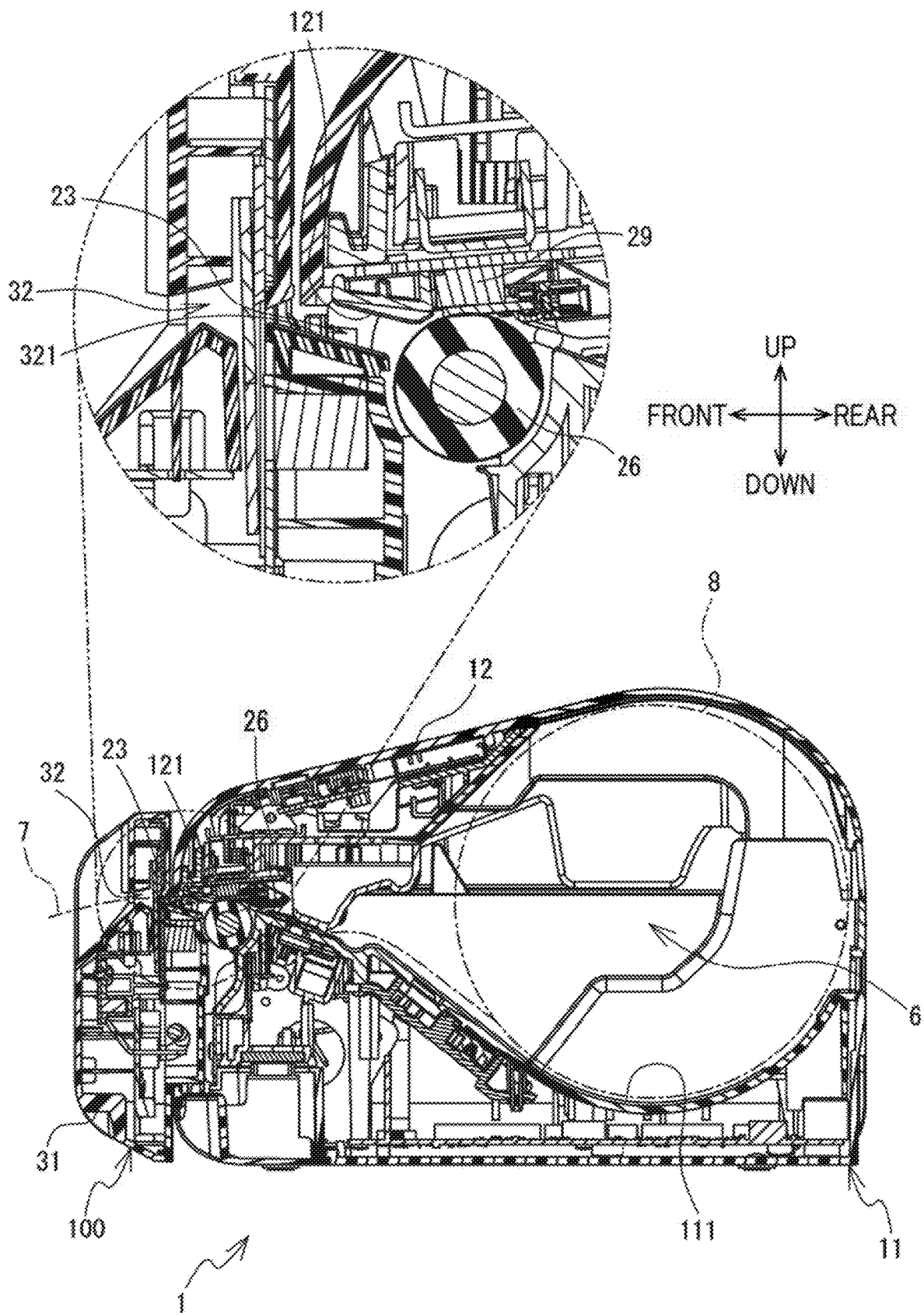
FIG. 2 is a cross-sectional view illustrating an internal configuration of the printing device as viewed from the right side thereof.

As illustrated in FIG. 2, a platen roller 26, an inner cover 111, and an accommodating portion 6 are provided in the lower casing 11. The inner cover 111 has a rear portion curved downward to have an arc shape. Although not illustrated in the drawings, the printing device 1 further includes an electronic circuit board positioned further downward relative to the inner cover 111. The electronic circuit board is configured to control operations in the printing device 1. The printing device 1 further includes a conveyer motor (not illustrated; described later) for rotating the platen roller 26.

The accommodating portion 6 is an internal space of the printing device 1 that is defined by the inner cover 111. The accommodating portion 6 is configured to accommodate therein the roll 8 while a hollow cylindrical core of the roll 8 extends in the left-right direction. The roll 8 is formed by winding the printing medium 7 around the hollow cylindrical core. The printing medium 7 includes a mount and a heat-sensitive label adhered to the mount. The platen roller 26 is a roller having a solid cylindrical shape and is configured to convey the printing medium 7. The platen roller 26 extends in the left-right direction which is a longitudinal direction of the unit discharge opening 32.

A thermal head 29 and an upper discharge portion 121 are provided in the upper casing 12. The thermal head 29 extends in the left-right direction. The thermal head 29 includes a plurality of heat-generating elements arranged in the left-right direction. The thermal head 29 is configured to be controlled by the electronic circuit board to apply heat to the heat-sensitive label, thereby printing characters and the like on the heat-sensitive label which is a printing medium.

The upper discharge portion 121 is positioned at a front end portion of the upper casing 12. The upper discharge portion 121 extends in the left-right direction. The upper discharge portion 121 is inclined diagonally upward toward a front end thereof. In a state where the cutting device 100 is mounted in the printing device 1, the upper discharge portion 121 is disposed adjacent to and faces a lower discharge portion 321 (described later) of the cutting device 100. The lower discharge portion 321 is inclined diagonally upward toward a front end thereof. The upper discharge portion 121 and the lower discharge portion 321 form a casing discharge opening 23 therebetween. The casing discharge opening 23 is in communication with the unit discharge opening 32.

Figure 3:
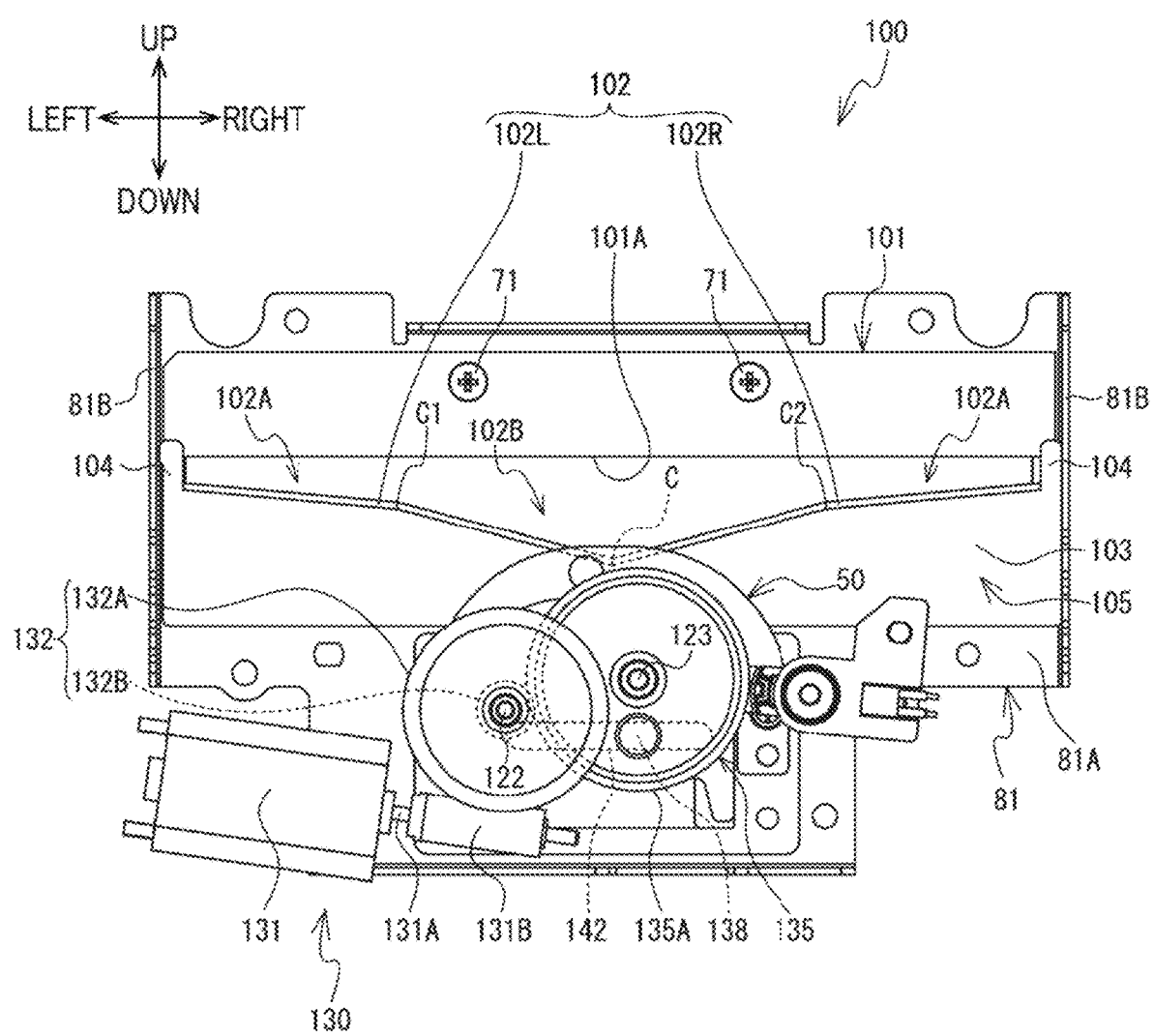
FIG. 3 is a front view of a cutting device.

Next, the cutting device 100 will be described. The cutting device 100 is an example of an optional unit mountable in the printing device 1 for use with the printing device 1, and is configured to cut the printing medium 7 discharged through the casing discharge opening 23 as a cut target. As illustrated in FIG. 3, the cutting device 100 includes a unit casing 31 having a generally box-like shape elongated in the left-right direction. The cutting device 100 further includes a first frame 81, a fixed blade 101, a movable blade 105, and a movable blade driving mechanism 130 those are accommodated in the unit casing 31.

Figure 5:
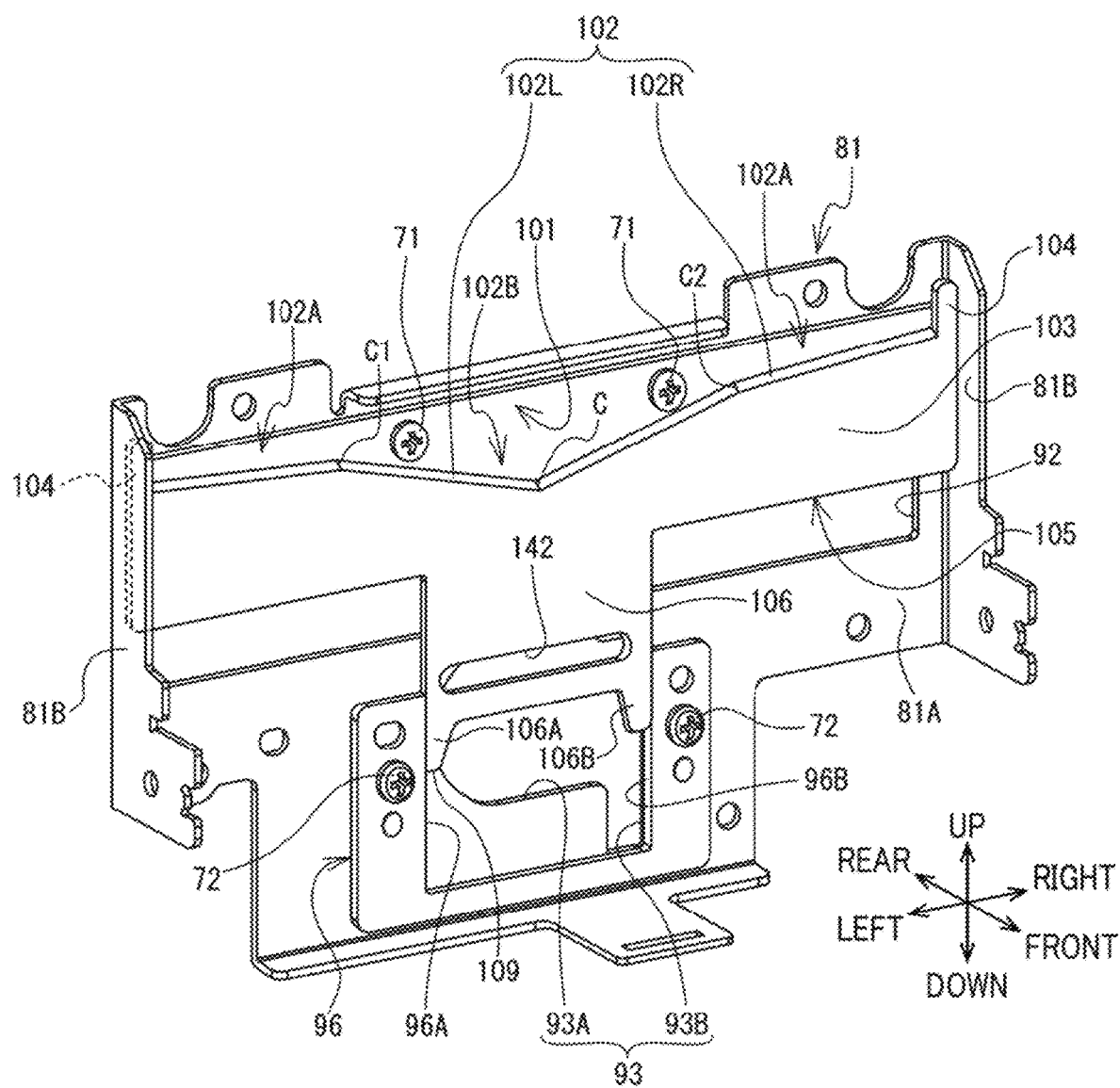
FIG. 5 is a perspective view of a first frame, the fixed blade, and the movable blade.

The first frame 81 is a sheet metal fixed to the unit casing 31. As illustrated in FIG. 5, the first frame 81 includes a rectangular plate 81A, and a pair of auxiliary guide plates 81B. The rectangular plate 81A extends in the left-right direction. The auxiliary guide plates 81B extend frontward from respective ends in the left-right direction of the rectangular plate 81A. The rectangular plate 81A is formed with a passage hole 92 at a center portion in an up-down direction thereof to allow the printing medium 7 to pass therethrough. The passage hole 92 has a rectangular shape elongated in the left-right direction. The front end of the lower discharge portion 321 enters the passage hole 92.

The rectangular plate 81A is also formed with a through-hole 93 at a lower portion thereof. The through-hole 93 includes a circular hole 93A, and a rectangular hole 93B elongated in the up-down direction and positioned rightward of the circular hole 93A. The cutting device 100 further includes an auxiliary plate 96 fixed to a front surface of the rectangular plate 81A at the lower portion thereof. The auxiliary plate 96 has a substantially U-shape in a front view. The auxiliary plate 96 has a left inner surface (an inner side surface of a left portion of the auxiliary plate 96) and a right inner surface (an inner side surface of a right portion of the auxiliary plate 96) functioning as a guide portion 96A and an auxiliary guide portion 96B, respectively. The guide portion 96A and the auxiliary guide portion 96B are positioned leftward and rightward of the through-hole 93 in the front view, respectively.

Figure 4:
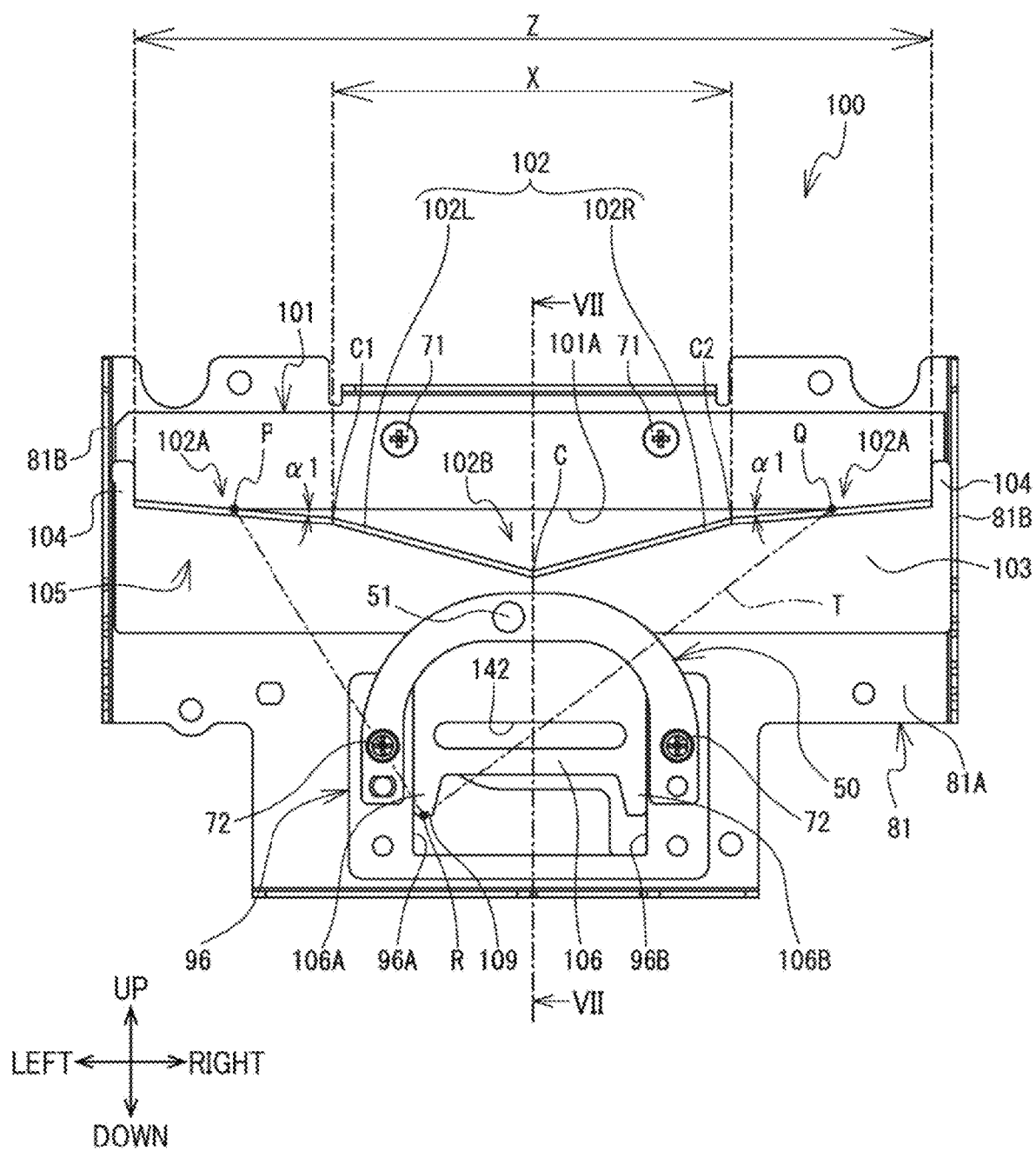
FIG. 4 is a front view of the cutting device in which a movable blade driving mechanism is omitted, and particularly illustrating a state where a fixed blade and a movable blade contact each other at end portions of the movable blade.

As illustrated in FIGS. 3 through 5, the fixed blade 101 has a substantially flat plate-like shape and has a thickness in the front-rear direction. The fixed blade 101 is fixed to the front surface of the rectangular plate 81A by two screws 71. The fixed blade 101 has a lower end formed with a first blade edge portion 101A extending linearly in the left-right direction.

Figure 7:
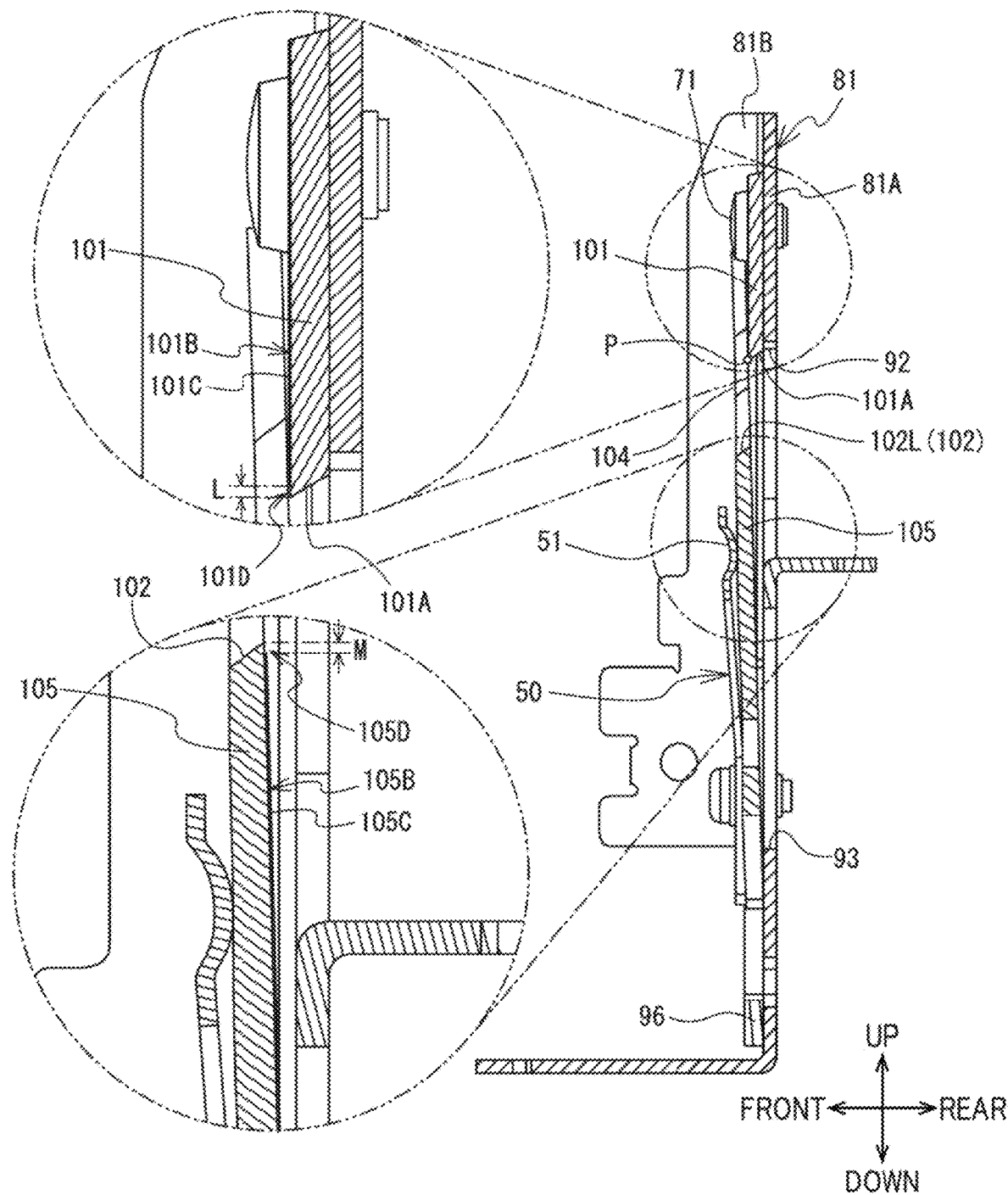
FIG. 7 is a cross-sectional view of the first frame, the fixed blade, and the movable blade taken along line VII-VII of FIG. 4.

As illustrated in FIG. 7, the fixed blade 101 is positioned rearward of the movable blade 105. The fixed blade 101 has a front surface 101B configured to face the movable blade 105, and a rear surface opposite the front surface 101B in the front-rear direction. In other words, the front surface 101B is closer to the movable blade 105 in the front-rear direction than the rear surface of the fixed blade 101 is to the movable blade 105. The fixed blade 101 includes an adhesion suppressing layer 101C for suppressing adhesion of adhesive material formed on the front surface 101B. The adhesion suppressing layer 101C is formed by coating the front surface 101B with fluoropolymer, for example. However, the adhesion suppressing layer 101C is not formed on a distal end portion 101D of the first blade edge portion 101A. The distal end portion 101D is a region L (see FIG. 7) including a cutting edge of the first blade edge portion 101A and having a dimension in the up-down direction that is not less than 0.5 mm and not greater than 5 mm.

A tape including an adhesive layer may be used for the printing medium 7 as the cut target. By defining the dimension of the region L not less than 0.5 mm in the distal end portion 101D, the cutting edge of the first blade edge portion 101A can be maintained sharp, thereby securing a sufficient cutting performance for cutting the cut target through rubbing (sliding) movement of the first blade edge portion 101A relative to a cutting edge of the movable blade 105. Further, by defining the dimension of the region L not greater than 5 mm in the distal end portion 101D, in a case where the adhesive material is adhered to the cutting edge of the first blade edge portion 101A, the adhesive material can be easily displaced onto a surface of the adhesion suppressing layer 101C because of the rubbing movement of the cutting edge of the movable blade 105 relative to the cutting edge of the first blade edge portion 101A so as to be separated from the fixed blade 101, thereby bringing the fixed blade 101 to be free from the adhesive material.

As illustrated in FIGS. 3 through 5, the movable blade 105 has a substantially flat plate-like shape and has a thickness in the front-rear direction. The movable blade 105 is supported by the first frame 81 so as to be movable in the up-down direction. The movable blade 105 is positioned frontward relative to the fixed blade 101 and the rectangular plate 81A of the first frame 81. Hence, a direction from the movable blade 105 toward the fixed blade 101 and the rectangular plate 81A corresponds to a rearward direction. The movable blade 105 is supported by the first frame 81 while the movable blade 105 contacts the first frame 81 and the fixed blade 101. As illustrated in FIG. 7, the movable blade 105 is inclined such that the movable blade 105 extends from the rear-lower side toward the front-upper side in a side view.

The movable blade 105 has an upper portion 103 contacting the fixed blade 101 from the front side of the fixed blade 101. The upper portion 103 includes a second blade edge portion 102, and a pair of extension portions 104. The second blade edge portion 102 is configured to cut the printing medium 7 in cooperation with the first blade edge portion 101A. The second blade edge portion 102 has a substantially valley-like shape such that a center portion 102B (i.e., a center C) in the left-right direction of the second blade edge portion 102 is positioned further downward relative to end portions 102A in the left-right direction of the second blade edge portion 102 in a front view. In other words, the second blade edge portion 102 is formed such that the center portion 102B is positioned closer to a contacting portion 109 (described later) than the end portion 102A are to the contacting portion 109.

The extension portions 104 extend upward from the respective end portions in the left-right direction of the second blade edge portion 102. The extension portions 104 are positioned further inward relative to the respective auxiliary guide plates 81B of the first frame 81 in the left-right direction. With this configuration, displacement in the left-right direction of the movable blade 105 is restrained.

The second blade edge portion 102 has a left inclined blade portion 102L, and a right inclined blade portion 102R. The left inclined blade portion 102L and the right inclined blade portion 102R are symmetrically to each other in the left-right direction. Each of the left inclined blade portion 102L and the right inclined blade portion 102R extends diagonally downward toward the center C in the left-right direction of the second blade edge portion 102. Hereinafter, an inclination angle of the left inclined blade portion 102L and the right inclined blade portion 102R of the second blade edge portion 102 relative to the left-right direction (i.e., the direction in which the first blade edge portion 101A extends) will be referred to as "shearing angle".

Figure 8:
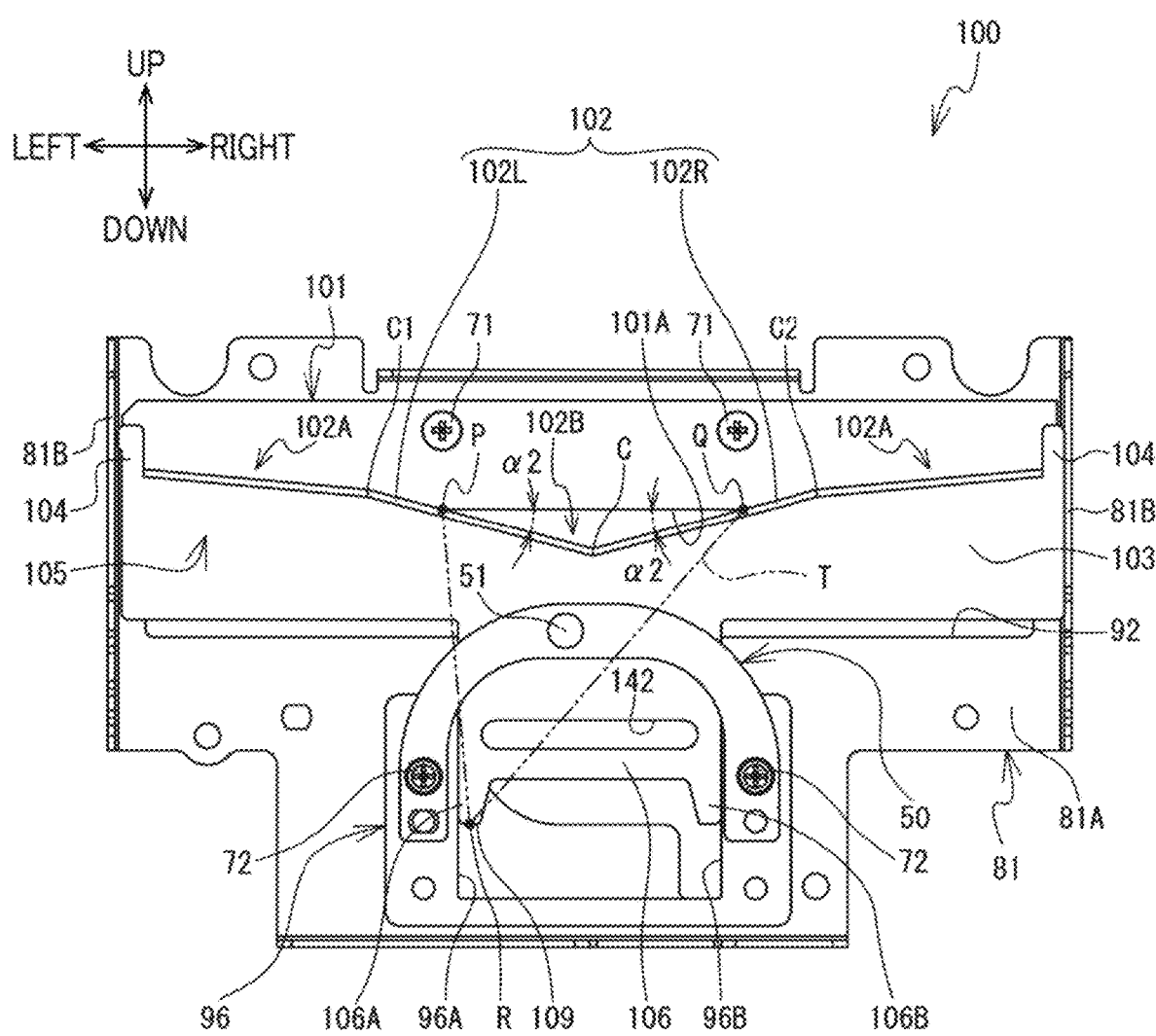
FIG. 8 is a front view of the cutting device in which the movable blade driving mechanism is omitted, and particularly illustrating a state where the fixed blade and the movable blade contact each other at a center portion of the movable blade.

The left inclined blade portion 102L extends linearly and is bent at an inclination changing point C1 positioned at an approximate center in the left-right direction of the left inclined blade portion 102L as a boundary, and the right inclined blade portion 102R extends linearly and is bent at an inclination changing point C2 positioned at an approximate center in the left-right direction of the right inclined blade portion 102R as a boundary. As illustrated in FIGS. 4 and 8, the shearing angles in the left inclined blade portion 102L and the right inclined blade portion 102R in the second blade edge portion 102 vary at the changing points C1 and C2, respectively. That is, the second blade edge portion 102 has a plurality of shearing angles.

The shearing angle at each of the end portions 102A in the left-right direction of the second blade edge portion 102 will be referred to as "first shearing angle $\alpha 1$" illustrated in FIG. 4. That is, among the left inclined blade portion 102L, a portion positioned leftward of the changing point C1 has the first shearing angle α1. Similarly, among the right inclined blade portion 102R, a portion positioned rightward of the changing point C2 also has the first shearing angle α1.

On the other hand, the shearing angle at the center portion 102B in the left-right direction of the second blade edge portion 102 will be referred to as "second shearing angle α2" illustrated in FIG. 8. That is, among the left inclined blade portion 102L, a portion positioned rightward of the changing point C1 (i.e., the remaining portion of the left inclined blade portion 102L) has the second shearing angle α2. Similarly, among the right inclined blade portion 102R, a portion positioned leftward of the changing point C2 (i.e., the remaining portion of the right inclined blade portion 102R) has the second sharing angle α2.

The second shearing angle α2 is larger than the first shearing angle α1. That is, the second shearing angle α2 at the center portion 102B of the left inclined blade portion 102L and the right inclined blade portion 102R is larger than the first shearing angle α1 at each end portion 102A of the left inclined blade portion 102L and the right inclined blade portion 102R.

Among the left inclined blade portion 102L and the right inclined blade portion 102R, a region having the second shearing angle α2 (i.e., a region whose shearing angle is the second shearing angle α2) will be referred to as "second shearing angle region X" (see FIG. 4). That is, the center portion 102B of the second blade edge portion 102 (i.e., the regions of the second blade edge portion 102 between the changing points C1 and C2) is defined as the second shearing angle region X. In the present embodiment, the second shearing angle region X occupies half of an entire region Z of the second blade edge portion 102. The second shearing angle region X should be smaller than or equal to two-thirds of the entire region Z of the second blade edge portion 102.

As illustrated in FIG. 7, the movable blade 105 has a rear surface 105B configured to face the fixed blade 101, and a front surface opposite the rear surface 105B in the front-rear direction. In other words, the rear surface 105B is closer to the fixed blade 101 in the front-rear direction than the front surface of the movable blade 105 is to the fixed blade 101. The movable blade 105 also includes an adhesion suppressing layer 105C for suppressing adhesion of adhesive material formed on the rear surface 105B. Similar to the adhesion suppressing layer 101C, the adhesion suppressing layer 105C is formed by coating the rear surface 105B with fluoropolymer. However, the adhesion suppressing layer 105C is not formed on a distal end portion 105D of the second blade edge portion 102 of the movable blade 105. The distal end portion 105D is a region M (see FIG. 7) including a cutting edge of the second blade edge portion 102 (i.e., the cutting edge of the movable blade 105) and has a dimension in the up-down direction that is not less than 0.5 mm and not greater than 5 mm.

By defining the dimension of the region M not less than 0.5 mm in the distal end portion 105D, the cutting edge of the second blade edge portion 102 can be maintained sharp to secure a sufficient cutting performance for cutting the cut target through rubbing movement of the second blade edge portion 102 relative to the cutting edge of the fixed blade 101. Further, by defining the dimension of the region M not greater than 5 mm in the distal end portion 105D, in a case where the adhesive material is adhered to the cutting edge of the second blade edge portion 102, the adhesive material can be easily displaced onto a surface of the adhesion suppressing layer 105C because of the rubbing (sliding) movement of the cutting edge of the second blade edge portion 102 relative to the cutting edge of the fixed blade 101 to cause the adhesive material be separated from the movable blade 105, thereby bringing the movable blade 105 to be free from the adhesive material.

Further, although not illustrated in the drawings in detail, the second blade edge portion 102 is warped so as to be positioned rearward from the end portions 102A toward the center C of the second blade edge portion 102. Hence, as illustrated in FIG. 4, the left inclined blade portion 102L contacts the first blade edge portion 101A of the fixed blade 101 at a single point of contact, and the right inclined blade portion 102R contacts the first blade edge portion 101A of the fixed blade 101 at a single point of contact. Hereinafter, the single point of contact between the left inclined blade portion 102L and the first blade edge portion 101A will be referred to as "first contacting point P", whereas the single point of contact between the right inclined blade portion 102R and the first blade edge portion 101A will be referred to as "second contacting point Q". Both the first contacting point P and the second contacting point Q are cutting points at which the printing medium 7 is cut. In accordance with upward movement of the movable blade 105, the first contacting point P and the second contacting point Q are moved toward the center C of the movable blade 105.

As illustrated in FIGS. 4 and 5, the movable blade 105 further includes a lower portion 106 extending downward from the upper portion 103 and having a rectangular shape in the front view. The lower portion 106 includes a first piece portion 106A, and a second piece portion 106B. The first piece portion 106A and the second piece portion 106B extend from respective left end portion and right end portion of a lower end portion in the lower portion 106, and have generally rectangular shapes in the front view. The first piece portion 106A is in contact with the guide portion 96A to position the movable blade 105 in the left-right direction. The second piece portion 106B faces the auxiliary guide portion 96B so that displacement in the left-right direction of the movable blade 105 is restrained.

As described above, the movable blade 105 is inclined so as to extend diagonally from the rear-lower side toward the front-upper side in the side view. A lower end of the first piece portion 106A contacts the front surface of the rectangular plate 81A of the first frame 81. On the other hand, the second piece portion 106B is positioned frontward of the through-hole 93 of the rectangular plate 81A, and therefore does not contact the rectangular plate 81A. In the following description, the lower end of the first piece portion 106A will be referred to as "contacting portion 109", and a point of contact between the contacting portion 109 and the first frame 81 will be referred to as "third contacting point R" (see FIGS. 4 and 8). The contacting portion 109 is included in the first piece portion 106A. For the purpose of convenience, the third contacting point R is assumed to be positioned at a center in the left-right direction of the contacting portion 109.

Further, the first contacting point P, the second contacting point Q, and the third contacting point R define an imaginary triangle T by serving as vertexes of the imaginary triangle T (see FIGS. 4 and 8). The imaginary triangle T is a scalene triangle. Among three sides of the imaginary triangle T, a side connecting the first contacting point P to the third contacting point R is shorter than a side connecting the second contacting point Q to the third contacting point R.

As illustrated in FIGS. 4 and 7, the cutting device 100 further includes a pressing member 50 that is a leaf spring having an inverted U-shape in the front view. The pressing member 50 and the auxiliary plate 96 are fixed together to the front surface of the rectangular plate 81A by two screws 72. The pressing member 50 includes a pressure contacting portion 51 at an upper portion of the pressing member 50 and at a position slightly deviated leftward from a center in the left-right direction thereof. The pressure contacting portion 51 is configured to the lower portion 106 of the movable blade 105 to urge the movable blade 105 rearward. The pressure contacting portion 51 is curved to have a partial spherical shape and makes point contact with the lower portion 106 of the movable blade 105. That is, the pressure contacting portion 51 makes contact with the lower portion 106 at a position downward and leftward relative to the center C of the movable blade 105 to urge the movable blade 105.

Figure 6:
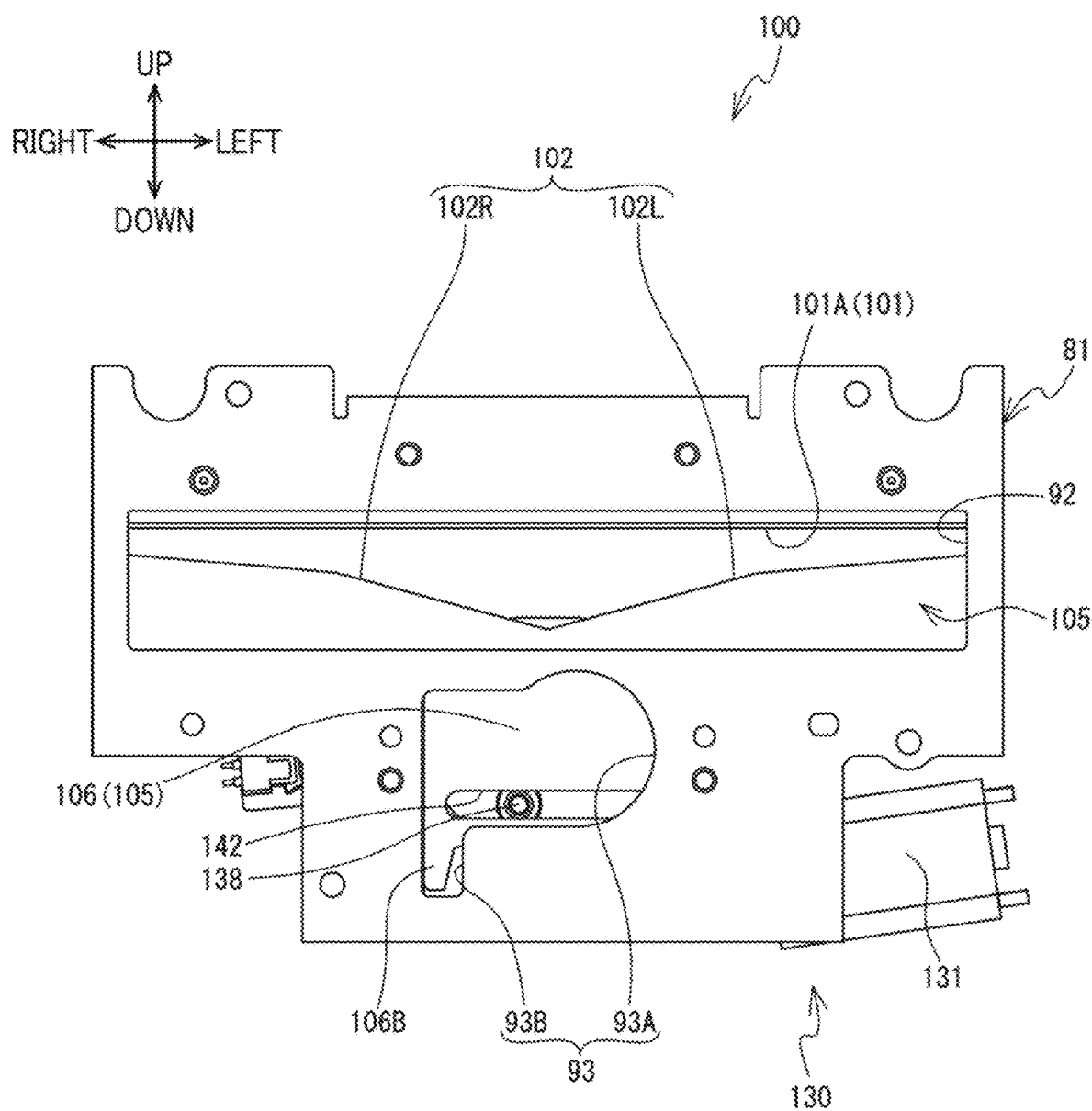
FIG. 6 is a rear view of the cutting device.

Next, the movable blade driving mechanism 130 will be described with reference to FIGS. 3 and 6. The movable blade driving mechanism 130 is configured to move the movable blade 105 in the up-down direction. The movable blade driving mechanism 130 includes a second frame (not illustrated), a motor 131, an intermediate gear 132, a rotary member 135, a pin 138, and an engagement portion 142.

The second frame is a sheet metal fixed to the front surface of the first frame 81. The motor 131 is fixed to the second frame by a screw (not illustrated). The motor 131 includes an output shaft 131A, and a worm 131B. The output shaft 131A is inclined to extend diagonally from the upper-left side toward the lower-right side, and the worm 131B is fixed to the output shaft 131A.

The intermediate gear 132 is rotatably supported by a support shaft 122 extending rearward from the second frame. The intermediate gear 132 includes a large-diameter gear 132A, and a small-diameter gear 132B positioned rearward of the large-diameter gear 132A. The large-diameter gear 132A is a worm wheel in meshing engagement with the worm 131B. The rotary member 135 is rotatably supported by a support shaft 123 extending rearward from the second frame. Accordingly, the rotary member 135 is rotatably supported by the second frame. The rotary member 135 includes a gear portion 135A in meshing engagement with the small-diameter gear 132B. Upon rotation of the output shaft 131A of the motor 131, the rotary member 135 is rotated through the worm 131B and the intermediate gear 132.

The engagement portion 142 is formed in the lower portion 106 of the movable blade 105, and is positioned frontward of the through-hole 93 of the rectangular plate 81A. The engagement portion 142 is an elongated slot extending parallel to the first blade edge portion 101A in the left-right direction. The engagement portion 142 penetrates the lower portion 106 in the front-rear direction in the present embodiment.

The pin 138 is provided at a position eccentric from the support shaft 123 by a predetermined radius centered on the support shaft 123. The pin 138 extends rearward from the rotary member 135 so as to be in engagement with the engagement portion 142 and to be inserted in the through-hole 93. The pin 138 is circularly movable around the support shaft 123 on an imaginary circle having the predetermined radius in accordance with the rotation of the rotary member 135. The through-hole 93 has a size sufficient to restrain the pin 138 from contacting an inner peripheral surface of the rectangular plate 81A defining the through-hole 93 during the circular movement of the pin 138.

In accordance with the rotation of the rotary member 135, the pin 138 is slidingly moved relative to the engagement portion 142 so that the movable blade 105 is moved in the up-down direction between a lowermost position (see FIG. 3) which is a lowermost end of a movable range of the movable blade 105, and an uppermost position (see FIG. 5) which is an uppermost end of the movable range of the movable blade 105. When the movable blade 105 is at the lowermost position, only the pair of extension portions 104 contacts the fixed blade 101 among the upper portion 103. When the movable blade 105 is at the uppermost position, the center C of the second blade edge portion 102 of the movable blade 105 is positioned above the first blade edge portion 101A of the fixed blade 101.

Next, a printing operation performed by the printing device 1 will be described with reference to FIGS. 1 and 2. In a state prior to start of the printing operation, the roll 8 is accommodated in the accommodating portion 6, and a leading end of the printing medium 7 is positioned adjacent to the casing discharge opening 23. As the user inputs an instruction to start the printing operation through the operating portion 14, the printing device 1 drives the conveyer motor to be rotated, thereby rotating the platen roller 26. The printing medium 7 is conveyed toward the cutting device 100 in accordance with the rotation of the platen roller 26.

At the same time, the printing device 1 drives the thermal head 29 to print desired characters such as letters, figures, and symbols on the printing medium 7. Through such operation, the printing device 1 performs printing on the printing medium 7 while conveying the printing medium 7, and the printed printing medium 7 is discharged through the unit discharge opening 32 in communication with the casing discharge opening 23. The printing operation is terminated as the printing device 1 stops the rotation of the conveyer motor and energization of the thermal head 29.

Next, a cutting operation performed by the cutting device 100 will be described with reference to FIGS. 3, 4, 6 and 8. The cutting operation is performed after the printing operation. When the printing device 1 drives the motor 131, a driving force of the motor 131 is transmitted to the rotary member 135 through the worm 131B and the intermediate gear 132. Therefore, the rotary member 135 is rotated in a clockwise direction in the front view to move the pin 138 upward. As the pin 138 is slidingly moved relative to the engagement portion 142, the movable blade 105 is moved upward from the lowermost position while the first piece portion 106A contacts the guide portion 96A and the rectangular plate 81A.

When the movable blade 105 moving upward reaches a specific movable range and is further moved upward, the movable blade 105 and the fixed blade 101 contacts each other at two points of contact, i.e., the first contacting point P and the second contacting point Q. The second blade edge portion 102 of the movable blade 105 nips the printing medium 7 in cooperation with the first blade edge portion 101A at the first contacting point P and the second contacting point Q to make a cut at each end in the left-right direction of the printing medium 7. The cuts formed in the respective ends of the printing medium 7 become greater toward the center C of the movable blade 105 in accordance with the upward movement of the movable blade 105.

Immediately after start of the cutting operation, the imaginary triangle T defined by the first contacting point P, the second contacting point Q, and the third contacting point R has a large area, so that stabilized rubbing load at the first contacting point P and the second contacting point Q can be sufficiently ensured irrespective of the scalene triangular shape of the imaginary triangle T. Further, since the pressure contacting portion 51 of the pressing member is positioned adjacent to the second blade edge portion 102 of the movable blade 105, a pressing force can be sufficiently applied to the movable blade 105. Accordingly, the fixed blade 101 and the movable blade 105 can ensure sufficient rubbing load at the first contacting point P and the second contacting point Q to perform smooth cutting operation with respect to the printing medium 7, in spite of the fact that the first shearing angle α1 at the end portions 102A of the second blade edge portion 102 of the movable blade 105 is smaller than the second shearing angle α2 at the center portion 102B of the second blade edge portion 102.

As the movable blade 105 is further moved upward, the first contacting point P and the second contacting point Q approach the center C of the second blade edge portion 102, whereby the area of the imaginary triangle T is reduced. Accordingly, stability of the rubbing load generated by the fixed blade 101 and the movable blade 105 at the first contacting point P and the second contacting point Q is lowered since the imaginary triangle T has a scalene triangular shape. Further, the pressure contacting portion 51 of the pressing member 50 is separated away from the second blade edge portion 102 of the movable blade 105, so that pressing load applied from the pressing member 50 to the movable blade 105 is lowered.

In this case, the first contacting point P and the second contacting point Q are moved to the center portion 102B of the second blade edge portion 102. The second shearing angle α2 at the center portion 102B of the second blade edge portion 102 is greater than the first shearing angle α1 at the end portions 102A of the second blade edge portion 102. Hence, the fixed blade 101 and the movable blade 105 generate sufficient rubbing load at the first contacting point P and the second contacting point Q, thereby continuing the cutting operation with respect to the printing medium 7.

Thereafter, the movable blade 105 reaches the uppermost position, and the pin 138 reaches an approximate center in the left-right direction of the engagement portion 142. The printing medium 7 is securely cut since the fixed blade 101 and the movable blade 105 constantly maintain sufficient rubbing load during the cutting operation. As the printing device 1 continues to drive the motor 131 to be rotated, the pin 138 is further circularly moved in a counterclockwise direction in the front view and is moved downward, thereby moving the movable blade 105 from the uppermost position to the lowermost position. The printing device 1 halts driving of the motor 131 when the movable blade 105 reaches the lowermost position. The user can take out the cut printed printing medium 7 through the unit discharge opening 32.

As described above, the first shearing angle α1 at the end portions 102A in the left-right direction of the second blade edge portion 102 is smaller than the second shearing angle α2 at the center portion 102B of the second blade edge portion 102. At a timing when the movable blade 105 starts to be moved upward during the cutting operation, the first contacting point P and the second contacting point Q those are the points of contact at which the second blade edge portion 102 contacts the first blade edge portion 101A are distant from each other. Therefore, a variance in rubbing load on the second blade edge portion 102 at the two points of contact (i.e., the first contacting point P and the second contacting point Q) is hardly to occur, thereby stabilizing rubbing load on the second blade edge portion 102 at the first contacting point P and the second contacting point Q.

Further, at a timing when the movable blade 105 starts to be moved, a pressing force imparted on the movable blade 105 by the pressing member 50 is sufficiently large. In this configuration, since the first shearing angle α1 at the end portions 102A is smaller than the second shearing angle α2 at the center portion 102B, the cutting device 100 does not apply excessively large cutting load on the target to be cut. Hence, the target to be cut can be cut properly.

In accordance with further upward movement of the movable blade 105, the first contacting point P and the second contacting point Q approach each other at the center portion 102B to cause the stability of the rubbing load on the second blade edge portion 102 to be lowered. Further, in accordance with the upward movement of the movable blade 105, a pressing force imparted on the movable blade 105 by the pressing member 50 becomes greater at the contacting portion 109 than at the second blade edge portion 102. Even in this configuration, since the second shearing angle α2 at the center portion 102B is greater than the first shearing angle α1 at the end portions 102A, sufficient rubbing load on the second blade edge portion 102 can be still ensured in spite of the fact that the pressing force applied to the second blade edge portion 102 is reduced, whereby the target to be cut can be cut well.

In the cutting device 100, the target to be cut can be securely cut by performing a cutting operation with respect to the target to be cut at the second shearing angle α2 in a region where the stability of the rubbing load is lowered when the first contacting point P and the second contacting point Q approach the center portion 102B in the left-right direction of the second blade edge portion 102. The cutting device 100 can securely cut the target, since the second shearing angle region X (a region whose shearing angle is the second shearing angle α2) is provided to be smaller than or equal to two-thirds of the entire region Z of the second blade edge portion 102.

Further, the left inclined blade portion 102L and the right inclined blade portion 102R of the second blade edge portion 102 are symmetrical to each other in the left-right direction. With this configuration, when the shearing angle changes at one of the left inclined blade portion 102L and the right inclined blade portion 102R in the second blade edge portion 102 during a cutting operation, the shearing angle at the other of the left inclined blade portion 102L and the right inclined blade portion 102R also changes simultaneously. Accordingly, stability of the rubbing road on the second blade edge portion 102 at the portions where the shearing angle changes can be enhanced to thereby appropriately cut the target to be cut.

Further, even in a case where the target to be cut includes an adhesive layer, adhesion of adhesive material to the front surface 101B of the fixed blade 101 and to the rear surface 105B of the movable blade 105 can be restrained by providing the adhesion suppressing layers 101C and 105C. Since the adhesion suppressing layers 101C and 105C are not formed on the distal end portions 101D and 105D of the first blade edge portion 101A and the second blade edge portion 102, respectively, a sufficient cutting force can be ensured so that a cutting operation with respect to the target to be cut can be performed well.

Further, the regions at which the adhesion suppressing layers 101C and 105C are not formed (i.e., the distal end portions 101D and 105D) include the cutting edges of the first blade edge portion 101A and the second blade edge portion 202, respectively, and have dimensions that are not less than 0.5 mm and not greater than 5 mm. With this configuration, sufficient regions at which the adhesion suppressing layers 101C and 105C are provided can be ensured. Therefore, adhesion of adhesive material on the regions at which the adhesion suppressing layers 101C and 105C are not formed is hardly to occur. Accordingly, sufficient cutting performance for cutting the target to be cut can be endured to cut the target to be cut appropriately.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, a moving direction in which the movable blade 105 is moved need not be limited to the up-down direction. The moving direction of the movable blade 105 may be the up-down direction, the left-right direction, or other directions. Further, the pressure contacting portion 51 may have a partial hollow cylindrical shape protruding rearward to be curved and extending in the left-right direction. In this case, the pressure contacting portion 51 is configured to make line contact with the movable blade 105. Other types of springs may be used as the pressing member 50 instead of a leaf spring. The engagement portion 142 need not be limited to a slot penetrating the movable blade 105 in the front-rear direction, but may be a groove having a front open end.

Figure 9:
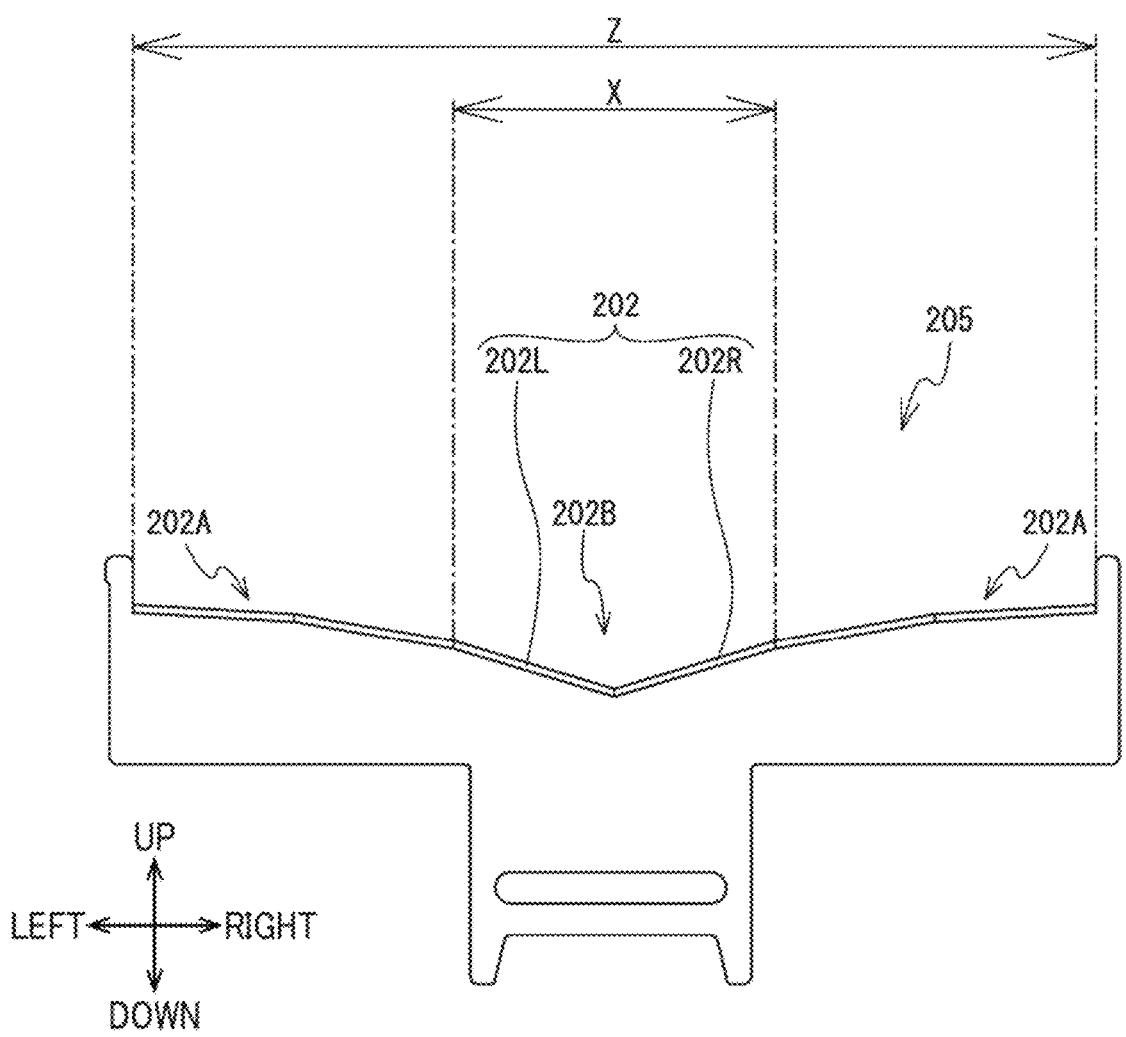
FIG. 9 is a front view of a movable blade.

In the above-described embodiment, each of the left inclined blade portion 102L and the left inclined blade portion 102L of the movable blade 105 has two regions whose shearing angles are different from each other. However, each of the left inclined blade portion 102L and the right inclined blade portion 102R may have three or more regions whose shearing angle are different from one another. FIG. 9 illustrates a movable blade 205 according to a first modification that can be employed in place of the movable blade 105. The movable blade 205 includes a second blade edge portion 202 having a left inclined blade portion 202L and a right inclined blade portion 202R those are symmetrically to each other in the left-right direction. Each of the left inclined blade portion 202L and the right inclined blade portion 202R has three regions whose shearing angles are different from one another.

In this case, the second shearing angle α2 at a center portion 202B in the left-right direction of the second blade edge portion 202 should be greater than the first shearing angle α1 at end portions 202A in the left-right direction of the second blade edge portion 202. Further, similar to the above-described embodiment, the second shearing angle region X at the center portion 202B should be smaller than or equal to two-thirds of the entire region Z of the second blade edge portion 202. Note that the second shearing angle region X has the largest shearing angle among the shearing angles provided in the entire region Z. That is, the second shearing angle α2 is the largest shearing angle among the shearing angles. According to this modification, since each the plurality of regions having shearing angles different from one another in the second blade edge portion 202 extends linearly, the second blade edge portion 202 can be easily provided, thereby reducing manufacturing costs of the cutting device 100.

Figure 10:
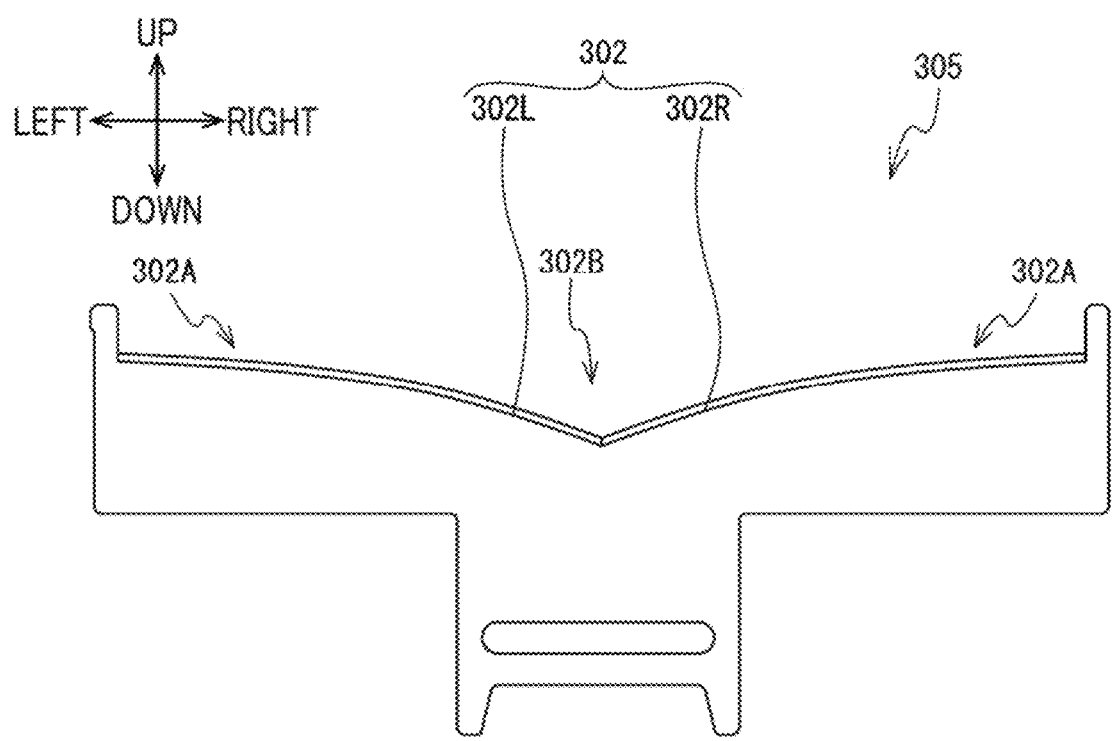
FIG. 10 is a front view of a movable blade.

As another modification, each of the left inclined blade portion 102L and the right inclined blade portion 102R may be formed in a curved shape such that shearing angle in the second blade edge portion 102 varies continuously. FIG. 10 illustrates a movable blade 305 according to a second modification which can be employed instead of the movable blade 105 or the movable blade 205. The movable blade 305 includes a second blade edge portion 302 having a left inclined blade portion 302L and a right inclined blade portion 302R those are symmetrically to each other. Each of the left inclined blade portion 302L and the right inclined blade portion 302R has a curved shape such that shearing angles thereof are gradually increased in a direction from each end portion 302A in the left-right direction toward a center portion 302B in the left-right direction of the second blade edge portion 302 of the movable blade 305.

In this case, the second shearing angle α2 at the center portion 302B of the second blade edge portion 302 should be greater than the first shearing angle α1 at the end portions 302A of the second blade edge portion 302. Also, the second shearing angle α2 at the center portion 302B should be the largest shearing angles in the entire region Z. According to this modification, since the second blade edge portion 302 has a curved shape so that the shearing angles at the second blade edge portion 302 change continuously during a cutting operation, stability of the rubbing load at the time of cutting operation can be enhanced, thereby appropriately cut the target to be cut. As a further modification, the second blade edge portion may be formed by combining a curved region with a linear region.

Further, material other than fluoropolymer may be employed to form the adhesion suppressing layers 101C and 105C by coating. Alternatively, the fixed blade 101 and the movable blade 105 may be subjected to surface machining to form adhesion suppressing layers 101C and 105C.

Remarks

The first frame 81 is an example of the "frame". The left-right direction is an example of the "extending direction". The up-down direction is an example of the "moving direction". The upper portion 103 is an example of the "one side portion in the moving direction of the movable blade", while the lower portion 106 is an example of the "another side portion in the moving direction of the movable blade". The printing medium 7 is an example of the "cut target". The movable blade driving mechanism 130 is an example of the "driving mechanism". The rearward direction is an example of the "first direction". The left inclined blade portions 102L, 202L, and 302L are each an example of the "one half portion in the extending direction of the second blade edge portion", while the right inclined blade portions 102R, 202R, and 302R are each an example of the "another half portion in the extending direction of the second blade edge portion". The front surface 101B is an example of the "first surface", and the rear surface of the fixed blade 101 is an example of the "second surface". The adhesion suppressing layer 101C is an example of the "first adhesion suppressing layer". The rear surface 105B is an example of the "third surface", and the front surface of the movable blade 105 is an example of the "fourth surface". The adhesion suppressing layer 105C is an example of the "second adhesion suppressing layer". The plurality of linear regions in the left inclined blade portions 102L and 202L are each an example of the "first regions".

The plurality of linear regions in the right inclined blade portions 102R and 202R are each an example of the "second regions". The left inclined blade portion 302L is an example of the "first curved region". The right inclined blade portion 302R is an example of the "second curved region".

What is claimed is:

1. A cutting device comprising:
   a frame;
   a fixed blade having a substantially flat plate-like shape and fixed to the frame, the fixed blade comprising a first blade edge portion extending linearly in an extending direction;
   a movable blade having a substantially flat plate-like shape, the movable blade being configured to be guided by the frame so as to be movable in a moving direction crossing the extending direction, the movable blade having one side portion and another side portion in the moving direction, the movable blade comprising:
      a contacting portion provided at the another side portion of the movable blade and contacting the frame; and
      a second blade edge portion provided at the one side portion of the movable blade, the second blade edge portion having a substantially valley-like shape such that a center portion in the extending direction of the second blade edge portion is positioned closer to the contacting portion than both end portions in the extending direction of the second blade edge portion are to the contacting portion, the second blade edge portion being configured to rub against the first blade edge portion to cut a cut target;
   a driving mechanism configured to move the movable blade; and
   a pressing member configured to urge the movable blade in a first direction from the movable blade toward the fixed blade and the frame,
   wherein the second blade edge portion has a plurality of shearing angles that are inclination angles relative to the extending direction, the shearing angles including a first shearing angle that is the shearing angle at each end portion and a second shearing angle that is the shearing angle at the center portion, the second shearing angle being larger than the first shearing angle.

2. The cutting device according to claim 1,
   wherein the second shearing angle is the largest of the shearing angles, and
   wherein the second blade edge portion has a second shearing angle region whose shearing angle is the second shearing angle, the second shearing angle region being smaller than or equal to two-thirds of an entire region of the second blade edge portion.

3. The cutting device according to claim 2,
   wherein the second blade edge portion has one half portion and another half portion in the extending direction, and
   wherein the one half portion and the another half portion are symmetrical to each other.

4. The cutting device according to claim 3,
   wherein the fixed blade has a first surface and a second surface opposite the first surface in the first direction, the first surface being closer to the movable blade in the first direction than the second surface is to the movable blade,
   wherein the fixed blade includes a first adhesion suppressing layer formed on the first surface,
   wherein the first adhesion suppressing layer is not formed on a distal end portion of the first blade edge portion,
   wherein the movable blade has a third surface and a fourth surface opposite the third surface in the first direction, the third surface being closer to the fixed blade in the first direction than the fourth surface is to the fixed blade,
   wherein the movable blade includes a second adhesion suppressing layer formed on the third surface, and
   wherein the second adhesion suppressing layer is not formed on a distal end portion of the second blade edge portion.

5. The cutting device according to claim 4,
   wherein the distal end portion of the first blade edge portion includes a cutting edge of the first blade edge portion and has a dimension in the moving direction that is not less than and not greater than 5 mm, and
   wherein the distal end portion of the second blade edge portion includes a cutting edge of the second blade edge portion and has a dimension in the moving direction that is not less than and not greater than 5 mm.

6. The cutting device according to claim 1,
   wherein the second blade edge portion includes a plurality of first regions arranged from the center portion toward one of the end portions, each first region extending linearly and defining one of the shearing angles, the shearing angles defined by the first regions being different from each other.

7. The cutting device according to claim 6,
   wherein the second blade edge portion further includes a plurality of second regions arranged from the center portion toward another of the end portions, each second region extending linearly and defining one of the shearing angles, the shearing angles defined by the second regions being different from each other.

8. The cutting device according to claim 1,
   wherein the second blade edge portion has a first curved region extending from the center portion toward one of the end portions, the shearing angle of the second blade edge portion varying continuously in the first curved region.

9. The cutting device according to claim 8,
   wherein the second blade edge portion further has a second curved region extending from the center portion toward another of the end portions, the shearing angle of the second blade edge portion varying continuously in the second curved region.

* * * * *